Figure 1:
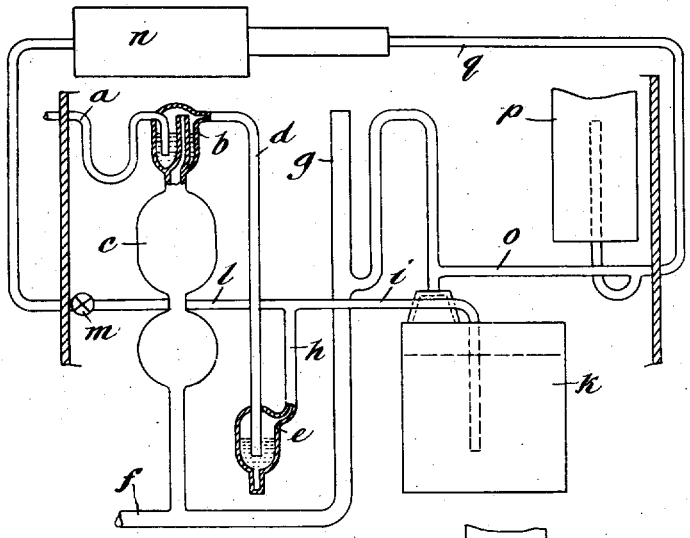

O. RODHE.

GAS ANALYZING APPARATUS.

APPLICATION FILED MAR. 3, 1922.

Reissued July 11, 1922. 15,409.

3 SHEETS—SHEET 1.

Inventor

Olof Rodhe,

By Kerr & Bros

Attorney

O. RODHE.

GAS ANALYZING APPARATUS.

APPLICATION FILED MAR. 3, 1922.

Reissued July 11, 1922. 15,409.

3 SHEETS—SHEET 2.

Inventor

Olof Rodhe

By Knight Bros

Attorney

O. RODHE.

GAS ANALYZING APPARATUS.

APPLICATION FILED MAR. 3, 1922.

Reissued July 11, 1922. 15,409.

3 SHEETS—SHEET 3.

Inventor

Olof Rodhe

By Kerr & Page

Attorney

UNITED STATES PATENT OFFICE.

OLOF RODHE, OF STOCKHOLM, SWEDEN, ASSIGNOR TO AKTIEBOLAGET INGENIÖRSFIRMA FRITZ EGNELL, OF STOCKHOLM, SWEDEN.

GAS-ANALYZING APPARATUS.

15,409. Specification of Reissued Letters Patent. Reissued July 11, 1922.

Original No. 1,302,224, dated April 29, 1919, Serial No. 145,206, filed January 29, 1917. Application for reissue filed March 3, 1922. Serial No. 540,914.

*To all whom it may concern:*

Be it known that I, OLOF RODHE, subject of the King of Sweden, residing at Rorstrandsgatan 30, Stockholm, Sweden, have invented certain new and useful Improvements in Gas-Analyzing Apparatus, of which the following is a specification.

This invention has for its object to provide automatically working gas analyzing apparatus for effecting two or more different analyses of different parts.

Heretofore a number of different automatically working gas analyzing apparatuses, for example for determining the percentage of carbon dioxide in the flue gases, have been known, in which it is possible to continually observe and determine one constituent of a mixture of gases. The control of the total combustion process, that is the simultaneous control of the different constituents of the mixture, is, however, not possible in these apparatuses. The complete control of the chemical processes is not always sufficient by the determination of only one gaseous product, in a combustion process, for example, not only the determining of the percentage of carbon dioxide is necessary, but also of carbon monoxide and in many cases also of oxygen or of the total percentage of carbon dioxide and oxygen.

Such a determination of two or more constituents of the mixture of gases could naturally be made in a simple way by using two or more automatically working apparatuses, one for each part. In order to obtain comparative analysis, it would however, then be necessary that the apparatuses used could be worked entirely synchronously which would be very expensive and practically impossible to effect in practice.

According to the present invention an apparatus for analyzing mixtures of gases is provided which avoids these inconveniences and consists of a single, automatically working apparatus that in the usual way is provided with at least a first and second measuring receptacle. The apparatus is according to the invention so constructed that at least one of the four main parts of a gas analyzing apparatus, viz, one of the first measuring receptacle, the absorption receptacle, the second measuring receptacle and the recording apparatus, is mutual for two combined apparatuses. By this arrangement complete synchronization is insured.

This invention may be carried out in different ways according to the desired result. The embodiments described below may serve as examples.

In all the embodiments the gas pipe is branched in such a manner, that the gas passes one way if a certain analysis is to be made, but another way if another analysis is to be made. The apparatuses are thereby so combined, that the gas current is forced by means of one or several cocks or by means of one or several variable liquid seals to take the one or the other way. The liquid seal is preferably so constructed that in a known manner, at the rising or falling of a column of liquid, gas pipe outlets are opened or closed.

Two separate cases may be noted. In the first case the gas sample conveyed into the apparatus is to be analyzed on the one or the other part, for example flue gases on carbon dioxide or oxygen, and in the second case the gas sample is to be analyzed on the one and the other part, for example flue gases on carbon dioxide and oxygen. In the first case the cock will mainly be used, but in the second case an automatically working shut-off organ.

In the first case, it will be question of analysis of different gas samples of the same composition concerning:—

(*a*) the one or the other, or a third gaseous part (*b*) the one and the other, or the one and the third gaseous part of a mixture of gases (*c*) the sum of two or more gaseous parts of a mixture of gases.

In the second case it will be a question of analysis of a single gas sample concerning:

(*d*) Several separate parts of the gas mixture either simultaneously or separately (*e*) The total percentage of several separate parts of the gas mixture, and (*f*) The percentages of several separate parts of the gas mixture as well as the total percentage of same.

In the determinations mentioned as the second case is usually analyzed a certain, measured quantity of gas that is investigated on its separate parts or on several of its parts simultaneously or nearly simultaneously, whereby this measured quantity of gas partly passes the one and partly the other way, or a third way, through the apparatus, while in the first case usually a new quantity of gas is taken at each analysis, which quantity of gas is conveyed either through the one or the other part of the apparatus.

A combination of the two cases may naturally also be used.

The apparatuses used are mainly constructed in a known manner. According to the two cases apparatuses are constructed in which either the absorption receptacle is arranged between two measuring receptacles or arranged in parallel to the second measuring receptacle. In the latter case the measuring is effected by the increase of pressure in the piping system acting upon the measuring apparatus.

As the invention is mainly used for flue gases, the treatment of such gases is hereinafter described. This will naturally not exclude the carrying out of other analyses, wherein other absorption means may be used. When in the following a common recording apparatus is mentioned it is thereby meant that one or several of the main parts of the recording apparatus, viz., the expansion receptacle, the floating bulb, the recording pen and the paper with the feeding apparatus, are common. These common receptacles may also each be divided into two or more parts that may be continually or intermittently connected with each other.

Figure 2:
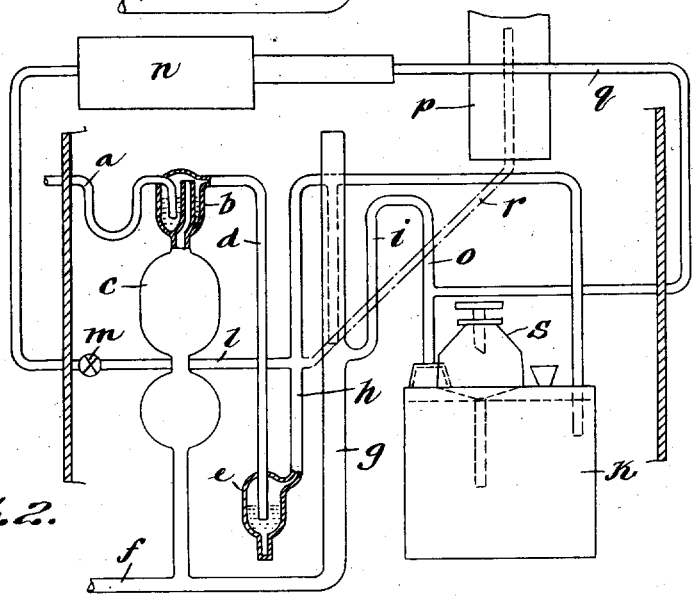
Figure 3:
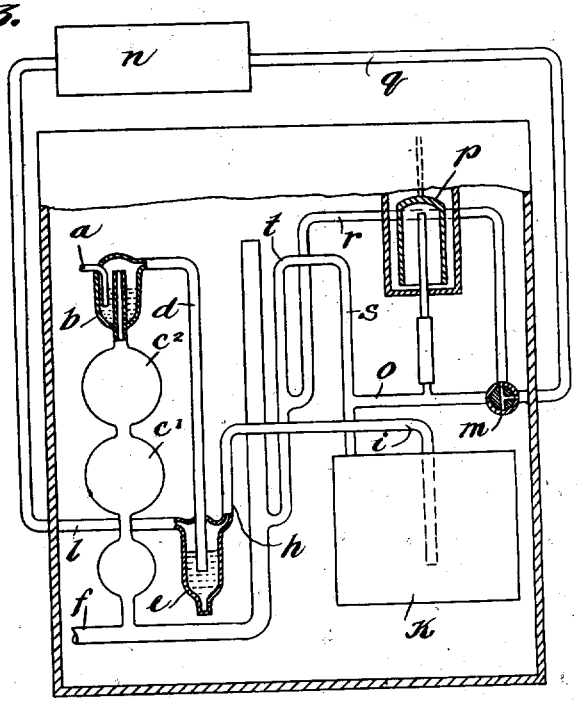

In the drawing some embodiments of the invention are illustrated in Figures 1 to 3. The difference between the two embodiments illustrated in Figs. 1 and 2 consists mainly in that in the apparatus according to Fig. 1 the two absorption receptacles are inserted between the two measuring receptacles, while in the embodiment shown in Fig. 2 the second measuring receptacle is arranged in parallel with the two absorption receptacles. Fig. 3 illustrates another form of the apparatus whereby separate halves of the gas sample may be successively or alternatively conveyed through separate absorption apparatus. Figs. 4 to 20 show diagrammatically a variety of arrangements of the apparatus which may be made.

In Fig. 1 the reference letter *a* indicates the gas supply. *b* a liquid seal, *c* the first measuring receptacle, *d* a discharge piping in connection with same, and *e* a second liquid seal in this piping. By means of the piping *f* a rising and falling column of liquid may act as well in the measuring receptacle *c* as in the ascending pipe *g*. When this column of liquid falls in the measuring receptacle *c*, the gas volume to be analyzed will be sucked in from the piping *a* through the seal *b* into the measuring receptacle *c*, and when the column of liquid then rises, it will be pressed through the liquid seal *e* to the piping *h*. This piping is branched in two pipes *i* and *l*, one of which, *i*, leads to the absorption receptacle *k* for the carbon dioxide containing for example a solution of caustic potash while the other, *l*, through a cock *m* leads to the absorption receptacle *n* for the oxygen containing for example pyrophorous iron. From the absorption receptacle *k* leads a pipe *o* and from the absorption receptacle *n* a pipe *q* to the second measuring receptacle *p* that in a known manner may be connected with a suitable measuring or recording apparatus.

When the cock *m* is shut, the gas volume to be analyzed streams through the pipe *i* to the receptacle *k* where the carbon dioxide is absorbed. The gas volume not absorbed then streams through the pipe *o* to the measuring receptacle *p* where its volume is determined. If however, the cock *m* is opened, the gas volume to be analyzed will stream through the pipe *l*, because the absorption receptacle *k* in this case will act as a liquid seal. The oxygen is absorbed in the receptacle *n* and the gas volume not absorbed will then stream on through the pipe *q* to the measuring receptacle *p*. The cock *m* is usually held closed, so that the percentage of carbon dioxide is investigated but when the percentage of oxygen is to be determined instead, the cock *m* is opened.

In the embodiment illustrated in Fig. 2 all parts are arranged as in Fig. 1 only with the exception that the pipes *q* and *o* are not connected with the measuring receptacle *p*, but have their outlets into the ascending pipe *g*. A pipe *r* leads from the pipe *h* to the measuring receptacle *p*. Further the absorption receptacle *k* is connected with a communicating receptacle *s*, in which the absorption liquid may rise to a high level. When the gas is pressed out of the receptacle *c*, it will stream through the absorption receptacle *n* or *k*, according to whether the cock *m* is open or not. The gas then presses on the surface of the liquid in the receptacle *k*, so that a part of this liquid will rise in the receptacle *s*. On account of the increase of pressure in the piping system, the indicator of the measuring receptacle *p* will be put in movement and the extension of this movement will show the volume of gas absorbed. The absorption means in the two receptacles *n* and *k* must naturally be chosen with respect to the parts of the mixture of gases.

If three or more different absorptions are to be made it is possible to insert other absorption receptacles in branches to the piping *h*, whereby however several cocks or one three or multiple way cock must be inserted in the corresponding pipe branches.

The apparatus may also be carried out in such way, that a part, for example half the gas volume measured in the measuring receptacle $c$ is conveyed through the absorption receptacle $k$, whereupon the other part is conveyed through the absorption receptacle $n$. The two gas volumes coming from the absorption receptacles, and which together act upon the measuring apparatus $p$, will then give a measure of the sum of the percentages of carbon dioxide and oxygen. An embodiment of a similar apparatus is shown in Fig. 3.

The first measuring receptacle Fig. 3 is divided into parts $c'$ and $c^2$. The shutting-off device $m$ is inserted in the piping $q$ and constructed as a three way cock. From this cock the pipe $r$ leads to the pipe $t$, that has its outlet in the ascending pipe $g$ arranged below the receptacle $c'$. The piping $t$ is by means of the piping $s$ connected with the piping $o$. The piping $r$ has its outlets into the pipe $t$ on the same level as the connection between the receptacles $c'$ and $c^2$. The pipe $l$ leads directly from the seal $e$ to the absorption receptacle $n$. If the cock $m$ has the position shown on the drawing the gas will stream the way $d—e—l—n—q—m—r—t—s—o—p$ when the pump liquid (mercury) rises in the receptacle $c'$. The oxygen is absorbed in the absorption receptacle $n$. The gas cannot stream through the piping $i$ because the absorption rceeptacle $k$ will act as a liquid seal. When the outlet of the piping $r$ into the pipe $t$ has been shut off at the further rising of the liquid, the gas in the receptacle $c^2$ must pass another way, and as now the resistance of the mercury in the pipe $t$ is greater than the resistance of the solution of caustic potash in the pipe $i$ is, the gas will stream from the receptacle $c^2$ into the absorption receptacle $k$, where the carbon dioxide is absorbed and therefrom to the second measuring receptacle $p$. In this receptacle will accordingly be collected a gas volume, the half of which is discharged from O and the other half from $CO_2$, and in this way is obtained on the measuring apparatus a record that corresponds to the value of the percentage of $O+CO_2$.

If the piping $r$ is shut off by the cock $m$ and the pipings $q$ and $o$ connected with each other, an oxygen analysis will be obtained, and if the cock $m$ is so adjusted that the pipings $q$, $r$ and $o$ are not connected with each other, a carbon dioxide analysis is obtained.

Figs. 4 to 20 illustrate schematically several embodiments. In these figures $M'$, $M^2$ and $M^3$ indicate measuring receptacles, $A'$, $A^2$ and $A^3$ absorbing receptacles and R, $R'$ and $R^2$ recording apparatuses.

Figure 4:
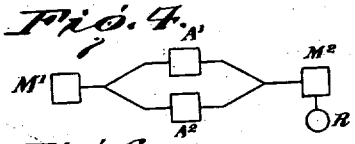

Fig. 4 corresponds to Fig. 1, Fig. 7 to Fig. 2 and Fig. 15 to Fig. 3, Fig. 4 accordingly shows an embodiment in which the gas from the first measuring receptacle $M'$ either takes the way through the absorption receptacle $A'$ or the way through the absorption receptacle $A^2$ or the way through a third, fourth or further absorption receptacle. The gas sample taken will in this embodiment accordingly take the way either to the one or to the other absorption receptacle.

Figure 5:
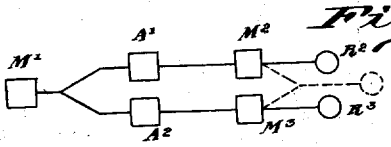
Figure 17:
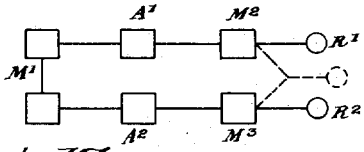

The embodiment schematically shown in Fig. 5 differs from the embodiment according to Fig. 4 only in that two second measuring receptacles are connected with different recording apparatuses or with one common apparatus. This embodiment is for many purposes (as then it is certain that gas of the same composition is analyzed) better carried out as shown in Fig. 17, in which embodiment the first measuring receptacle $M'$ is subdivided into two parts as is already shown in Fig. 3. A part of the gas sample will then pass to the absorption receptacle $A'$ and another part to the absorption receptacle $A^2$. In similar way the gas samples may be distributed in the embodiment illustrated in Fig. 5 whereby they may be conveyed the one way, through $A'$ or the other way through $A^2$.

Figure 6:
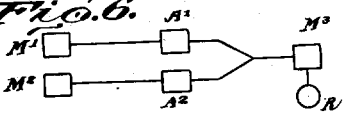
Figure 15:
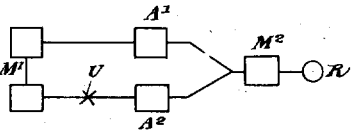

Fig. 6 shows an embodiment where the second measuring receptacle $M^3$ and the recording apparatus are common. An improved embodiment is shown in Fig. 15, where only a first measuring receptacle is arranged but subdivided in two parts as in Fig. 3, so that the gas from one gas sample streams partly to the one and partly to the other absorption receptacle.

Figure 7:
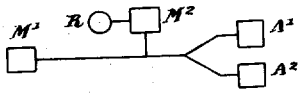

Fig. 7 shows an embodiment that is arranged on the same lines as that in Fig. 4. The difference only consists in that the second measuring receptacle $M^2$ is arranged in parallel with the absorption receptacles $A'$ and $A^2$, as shown in Fig. 2. The gas streams as in Fig. 4 either to the one or to the other absorption receptacle.

Figure 8:
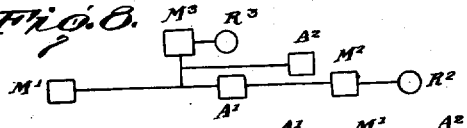

In the embodiment according to Fig. 8 the measuring receptacle $M^3$ is arranged in parallel with the absorption receptacle $A^2$, while the measuring receptacle $M^2$ and the absorption receptacle $A'$ are arranged in series. The gas will then stream as indicated in Figs. 4 and 7.

Figure 9:
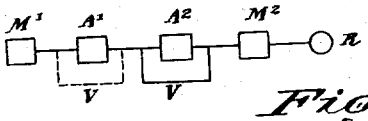
Figure 10:
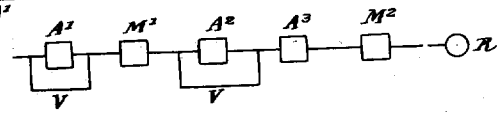
Figure 11:
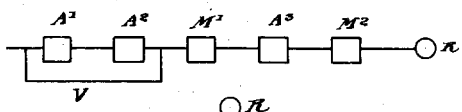

Fig. 9 shows an embodiment, where the two measuring receptacles are common. The absorption receptacles, or one of them, may by means of by pass pipes V be switched out, so that the gas either streams through the one or the other or through both the receptacles. It is evident that in this way several absorption receptacles may be arranged. Figs. 10 and 11 show similar embodiments.

Figure 12:
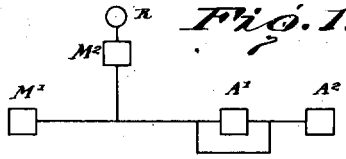
Figure 13:
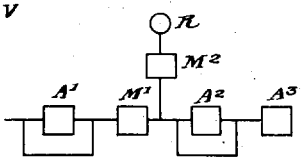
Figure 14:
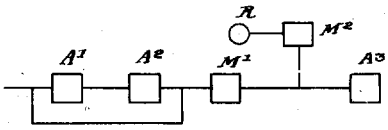

The embodiment shown in Fig. 12 differs from that shown in Fig. 9 only therein that the measuring receptacle $M^2$ is arranged in parallel to the absorption receptacles A′ and $A^2$. The embodiments according to Figs. 13 and 14 differ in the same respect from the embodiments according to Figs. 10 and 11.

Fig. 15 is already described above and Fig. 16 differs from Fig. 15 only in that the second measuring receptacle $M^2$ is arranged in parallel with the absorption receptacles A′ and $A^2$.

Figure 18:
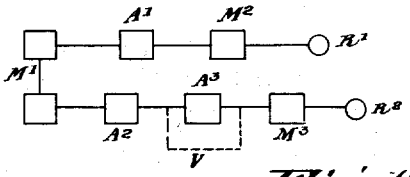

In Fig. 18 the only difference to be found from the embodiment shown in Fig. 17 is that two absorption receptacles are inserted in the one piping. One of these receptacles may when desired be switched out by means of a by pass pipe V. In this embodiment the measured volume of gas may partly be conveyed to the one or to the other or to both absorption receptacles.

Similarly to what is the case in Fig. 17 the two recording apparatuses R′ and $R^2$ may be replaced by a common recording apparatus.

Figure 19:
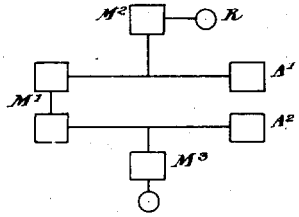
Figure 20:
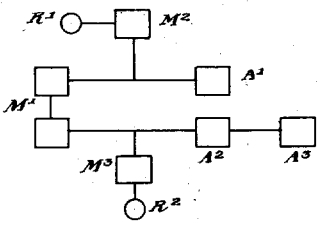

Fig. 19 and 20 correspond to the Figs. 17 and 18, the difference only lies therein that the measuring receptacles are arranged in parallel with the absorption receptacles.

Where in the foregoing specification absorption receptacles are referred to it should be understood that these receptacles may in several of the embodiments, act as reaction receptacles.

Figure 16:
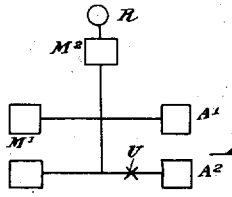

The adjustment of the pipings in the embodiments shown in Figs. 15 and 16 is effected by means of cocks or other shutting-off devices U.

It will be observed that in each illustration of my invention there are provided first or preliminary gas measuring apparatus, absorption apparatus, and second or final measuring apparatus, and that by reason of this provision of separate preliminary and final measuring apparatus and the connections shown, each of said measuring devices is limited to its one function of preliminary or secondary measurement, as the case may be, the direction of flow of the gas being always from the first to the second measuring apparatus, instead of in the reverse direction, or instead of having one of said measuring apparatuses perform for both primary and secondary measurement of the gas.

Having now particularly described and ascertained the nature of my said invention and in what manner the same is to be performed, I declare that what I claim is:

1. Automatically operated gas analyzing apparatus for two or more individual analyses of a gas mixture streaming through the apparatus in one direction only, comprising first measuring apparatus, absorption apparatus, second or final measuring apparatus and registering apparatus, means for connecting said apparatuses to allow the flow of gas through the same in two channels having one or more parts of the apparatus in common but each channel having other of said parts independent of the other channel, and controlling means for causing the gas flow to take one or the other channel through the first and final measuring apparatus always in the same direction.

2. Gas analyzing apparatus according to claim 1 characterized by the fact that the first and second measuring apparatuses and the registering apparatus are common to the two channels.

3. Gas analyzing apparatus according to claim 1 characterized by the fact that the first and second measuring apparatuses are common to the two channels.

4. Gas analyzing apparatus according to claim 1 characterized by the fact that the second measuring apparatus and the registering apparatus are common to the two channels.

5. Gas analyzing apparatus according to claim 1 characterized by the fact that the first measuring apparatus is common to the two channels.

6. Gas analyzing apparatus according to claim 1 characterized by the fact that the second measuring apparatus is common to the two channels.

7. Gas analyzing apparatus according to claim 1 characterized by the fact that the registering apparatus is common to the two channels.

OLOF RODHE.